United States Patent Office 2,706,466
Patented Apr. 19, 1955

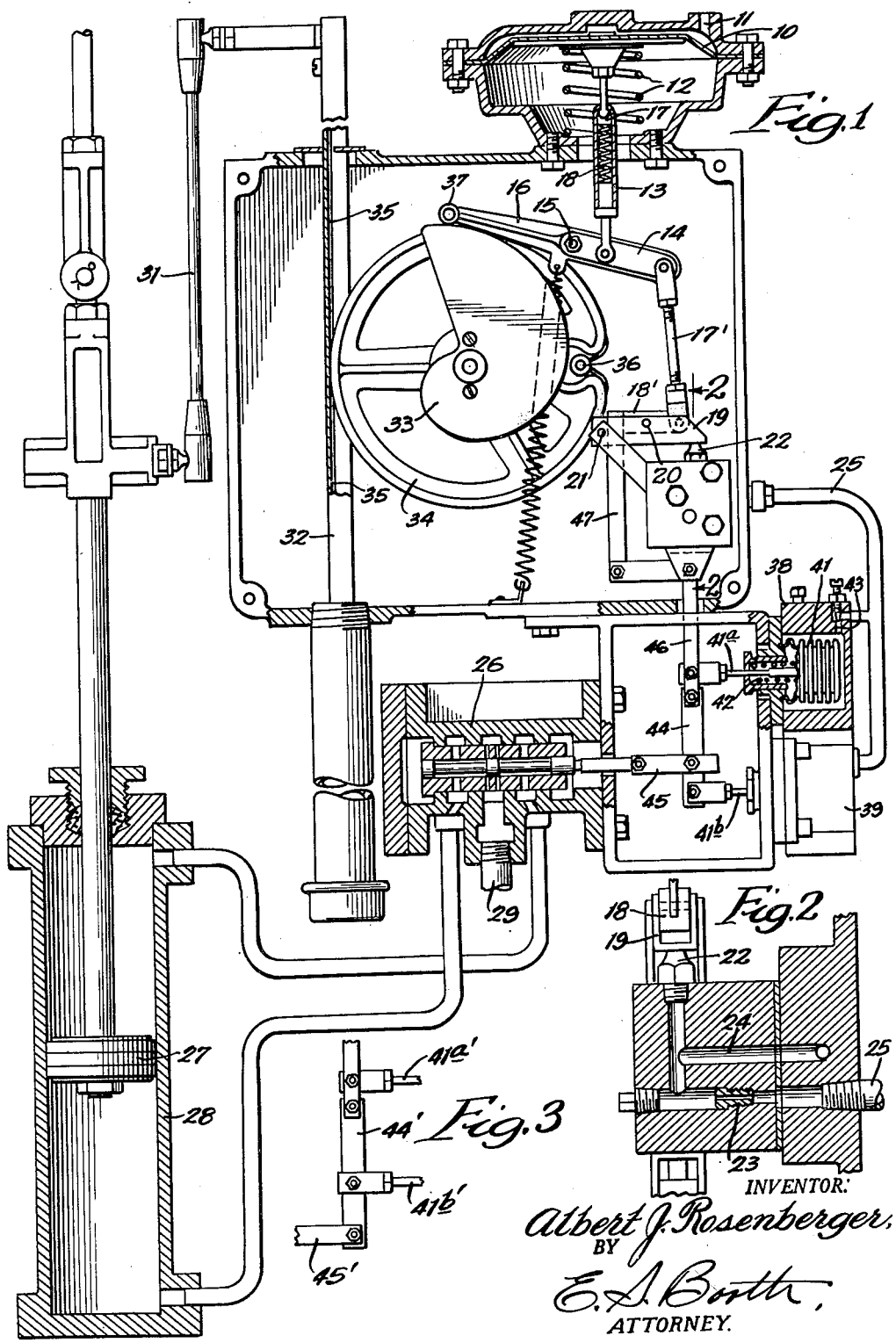

2,706,466

FLUID PRESSURE OPERATED REGULATORS

Albert J. Rosenberger, Chicago, Ill., assignor to Republic Flow Meters Company, Chicago, Ill., a corporation of Illinois Application July 3, 1951, Serial No. 234,970

9 Claims. (Cl. 121—41)

This invention relates to fluid operated control devices, and more particularly to regulators and the like powered by a compressible fluid, such as compressed air.

Fluid operated controllers or regulators of both the hydraulic and pneumatic type have been used extensively for the control of industrial processes, and are in general extremely satisfactory. Their greatest deficiency is their inability to make very small changes rapidly especially in installations requiring a large motor to move heavy control elements such as valves, which have a high initial friction and a large amount of inertia. This defect is accentuated in the case of pneumatically operated controllers since the pneumatic pressure must be built up to a relatively high value to overcome the starting friction and inertia so that a jumpy action results due to expansion of the fluid.

In the operation of conventional pneumatically operated controllers when a small deviation in the control impulse occurs requiring only a small motion of the fluid motor piston, the pilot valve is moved to open the ports only a slight amount. If there is considerable friction or inertia requiring an appreciable differential pressure, and especially if the cylinder volume is large the inflow and exhaust of the air will require a substantial time period. When the starting friction and inertia have been overcome, the piston moves with reduced effort and consequently even though the pilot valve is shut off when the piston has moved the proper distance, it will continue to move further due to expansion of the air. This overtravel is aggravated by the delay in starting the piston since in the interval of time required to start it the controller impulse continues to deviate further and demands a greater piston movement to correct it.

The inertia of the piston and the control element connected thereto also causes over-travel when making rapid correcting movements. In the ordinary controller or regulator when a deviation in control impulse causes pilot valve movement a corresponding piston movement will return the pilot valve to neutral. When, however, the piston and control element mass is moving at a substantial speed, it will continue to move past the desired position unless it is forced to stop by a reverse differential pressure, or unless the pilot valve is closed before it reaches the desired position so that it, in effect, coasts to the desired position.

It is one of the objects of the present invention to provide a fluid operated control device which will respond rapidly and accurately to small changes in the control force.

Another object is to provide a fluid operated control device in which the pilot valve is given an excess initial opening movement upon a change in the condition to be controlled and is lapped or closed prior to the time the piston reaches its new position thus producing a rapid corrective movement without overshooting.

Still another object is to provide a fluid operated control device in which the pilot valve is controlled by a force responsive unit instantaneously responsive to the controlling force and the controlling force is returned to normal by a second unit having a delayed action.

According to one feature, the pilot valve is jointly controlled by both of the units through a differential linkage.

The above and other objects and features of the invention will be more readily apparent from the following description when read in connection with the accompanying drawing, in which Figure 1 is a sectional more or less diagrammatic view of a fluid operated regulator embodying the invention;

Figure 2 is a partial section on the line 2—2 of Figure 1, and

Figure 3 is a partial elevation of a modified pilot valve control linkage.

The unit illustrated in Figure 1 is a pneumatic type regulator for regulating a condition such as flow, pressure, temperature or the like. The regulator includes a diaphragm 10 which may be connected through a connection 11 to a controller or the like which supplies a control impulse to the diaphragm. Pressure supplied through the connection 11 tends to force the diaphragm downward against a balancing spring 12 so that the diaphragm will move to a position corresponding to the value of the control impulse. While a diaphragm has been shown, it will be understood that for various types of conditions other types of elements designed to produce a movement proportional to control impulse other than fluid pressure could equally well be employed.

The diaphragm is connected through a safety spring unit 13 to a linkage which operates a waste valve device for producing a controlling pressure. The safety unit 13 as shown, comprises an outer casing connected to its lower end to the central portion of a lever 14 which is pivoted at one end at 15 to a second lever 16. The lever 16 is pivoted at its right end on a fixed pivot lying behind the lever 14 as seen in Figure 1. A block 17 is connected to the diaphragm 10 and is slidable in the tubular casing against a spring 18. This unit normally acts as a rigid link but if excessive force is developed in the diaphragm, the spring 18 will yield to prevent damage to the mechanism.

The other end of the lever 14 is connected through a link 17' to one end of a differential link 18' which is pivoted at its center through pivot 20 to a flapper valve 19. The flapper valve 19 is pivoted on a fixed pivot 21 and is adapted to move toward and away from a bleed nozzle 22 to vary the pressure back of the nozzle. As best seen in Figure 2, the nozzle is supplied with air under pressure through a restriction 23 and the space beneath the nozzle is connected through a passage 24 to a pipe 25. With this construction as is well understood in the art when the flapper valve 19 moves toward the nozzle the pressure back of the nozzle will increase, and when the flapper valve moves away from the nozzle the pressure will decrease.

The controlling pressure back of the nozzle is utilized to operate a pilot valve indicated generally at 26, to control movement of a piston 27 which is slidable in a cylinder 28. The opposite ends of the cylinder 28 are connected to ports in the pilot valve which is supplied with operating fluid such as compressed air, through a supply connection 29. When the pilot valve is in its lapped position as shown, both ends of the cylinder will be closed off. When the pilot valve is shifted to the left, the inlet connection 29 will be connected to the lower end of the cylinder and the upper end of the cylinder will be vented to cause the piston to move upward. When the pilot valve is shifted to the right these connections will be reversed to cause the piston 27 to move downward.

In addition to moving a control device such as a valve or the like, to return the condition to the desired value movement of the piston resets the flapper valve 19 to return the controlling pressure to the desired normal value. For this purpose the piston rod is connected through a link 31 to an elongated bar 32 which is guided for movement adjacent to a rotatable sheave 34. The sheave 34 carries a cam 33 and is geared to the bar 32 by means of tapes or cables 35 secured at their opposite ends to the ends of the bar and to a fitting 36 on the sheave. In this way as the piston moves the cam 33 will be turned. This cam engages a follower roller 37 on the left end of the lever 16 and as it moves it will swing the lever about the fixed pivot at its right end and move the pivot pin 15. The movement is in a direction to cause the lever 14 to swing in such a way that it will move the flapper valve 19 to its normal position.

The pilot valve is moved by two pressure responsive units which may be identical and which are responsive to the pressure in the pipe 25. As shown, there is an upper unit 38 and a lower unit 39, each comprising a hollow casing in which a flexible bellows 41 is mounted. The bellows are normally held extended by springs 42 and are adapted to collapse more or less in response to the controlling pressure in the pipe 25. The lower unit 39 has unrestricted communication with the pipe 25 so that it will move instantaneously in response to the controlling pressure. The upper unit has a delayed action produced by providing a restriction 43 in its communication with the pipe 25 so that its movement will follow changes in the controlling pressure at a slow rate.

In the arrangement shown in Figure 1, the bellows 41 of the two pressure responsive units are connected to the pilot valve through a differential linkage. As shown, this linkage includes a floating link 44 whose upper end is pivotally connected to the bellows of the unit 38 through the rod 41a and link 46, and whose lower end is pivotally connected to the bellows of the unit 39 through a rod 41b. The pilot valve is connected through a link 45 to the link 44 at a point intermediate its ends.

By varying the position of the connection of the link 45 to the link 44 different control characteristics can be imparted to the instrument. For example, when the connection is close to the lower unit 39 as shown, the pilot valve is moved primarily by the lower unit and to a very small extent by the upper unit. In fact, it is contemplated that the pilot valve may be connected directly to the lower unit so that it will be wholly unaffected by the upper unit. On the other hand when the connection is moved upward toward the upper unit the pilot valve moves in accordance with the differential of the movement of the two units which is very desirable for certain types of control.

For some types of control it may even be desired to employ the construction shown in Figure 3, in which parts corresponding to like parts are indicated by the same reference numerals primed. In this construction the rod 41a' is pivoted to the upper end of the floating link 44' while the rod 41b' is connected to the floating link intermediate its ends, and the link 45' is connected to the lower end of the floating link. With this construction the pilot valve will be given a multiplied movement proportional to the differential of movements of the two pressure responsive units which is desirable for certain other types of controls.

The unit 38 in addition to contributing to operation of the pilot valve also acts to reset the flapper valve 19. For this purpose its rod 41a is connected to the lower end of a bell crank lever 46 which is pivoted intermediate its ends to the bottom of the casing which carries the valve 22. A link 47 connects the opposite end of the bell crank lever to the lever 18 so that when the unit 38 shifts to the left it will tend to raise the flapper valve 19 from the nozzle.

Assuming that there is an increase in pressure on the sensing diaphragm 10 the diaphragm will move downward and will swing the lever 14 clockwise to push down on the right end of the lever 18 and lower the flapper valve 19 toward the nozzle 22. This will increase the controlling pressure in the pipe 25 and the unit 39 will respond instantly to the increase by shifting to the left. This will move the pilot valve to the left to supply air to the upper end of the cylinder and move the piston downward. Since there will necessarily be some time delay in this movement the pressure in the pipe 25 will increase to a value higher than it normally would so that the pilot valve will be moved further than would be the case in a conventional regulator in response to the same change in pressure on the sensing diaphragm. This causes an over-travel of the pilot valve resulting in wider opening of its ports than normal to produce an actuating impulse on the piston to overcome its initial starting friction and inertia.

The upper unit 38 will gradually move to the left in response to the increased controlling pressure at a rate determined by the adjustment of the restriction 43. This unit will ordinarily be moved before the piston comes to rest in its new position and as it moves it will swing the bell crank lever 46 and link 47 in a direction to move the bleeder valve 19 upward away from the nozzle to decrease the departure of the controlling pressure from its normal value. When the upper unit has moved to the full extent of its movement the pilot valve will be held displaced from its neutral position a distance proportional to the speed or rate of change of the control impulse on the diaphragm 10.

Throughout this portion of the control operation the piston will move at the same relative speed as the control diaphragm but will lag behind it. When the control impulse on the diaphragm changes less rapidly and finally reaches a constant value the piston will continue to travel and will begin to overtake the control diaphragm. Through the cam 33 the piston will at this time cause a reversal in movement of the bleeder valve 19 to move it further away from the nozzle 22 and cause a further decrease in the controlling pressure. As the piston moves downward it will turn the cam 33 counterclockwise to allow the left end of lever 16 to move downward. Thus pivot 15 will move downward and lever 14 will pivot about its connection to link 13 to raise its right end which is connected to the valve 19. The unit 39 will respond instantaneously to this decrease to move the pilot valve to its lapped or shut-off position so that actuating pressure to the piston will be cut off before it reaches its final position. Due to the delay in the response of the unit 38 to the decreased pressure the pressure will be decreased to a greater extent than it normally would. This enables the unit 39 to move the pilot valve to its lapped position before the piston reaches its final position. In fact the unit 39 may actually reverse the pilot valve to reverse the pressure on the piston and bring it to a stop quickly with no possibility of over-travel. Thus the piston is caused in effect, to coast to its final position to eliminate over-travel. Thus the piston is moved very rapidly and very accurately to the desired new position to effect a control operation at a relatively high speed and without hunting.

The parts can, if desired, be designed to produce a constant pulsating movement of the pilot valve thereby to eliminate any possibility of pilot valve sticking and to produce constant pressure pulsations on the piston which are normally insufficient to move the piston. This can be accomplished by adjusting the restriction 43 to reduce the rate of change of pressure to the pressure responsive unit 38. Under these conditions when the pilot valve has been moved to its lapped position rapidly by the unit 39 its position will be reversed slightly as the unit 38 responds to the value of the control pressure in the pipe 25. At the same time the unit 38 will move the flapper valve 19 slightly beyond its normal balanced position so that the controlling pressure in the pipe 25 will be changed to act through the unit 39 to lap the valve almost immediately. As the unit 38 moves in response to the changed value of the controlling pressure the pilot valve will again be reversed and the flapper valve will again be moved in the opposite direction beyond its normal position to produce another reversal in the controlling pressure. This can be highly advantageous in units wherein small adjusting movements are required since the parts can be adjusted so that the pressure impulses produced by these small rapid movements of the pilot valve are almost but not quite enough to move the piston. Thus the piston is subjected to a series of rapid pressure impulses in opposite directions which are almost, but not quite, enough to move it.

If there is any slight change in the position of the diaphragm 10 the pulses in one direction will become slightly larger so that they will be sufficient to move the piston a short distance in effect by nudging it. In this way very accurate small movements can be effected in a pneumatically operated device without producing over-travel of the piston and in a manner which is extremely difficult, if not impossible, with conventional types of regulators.

While one embodiment of the invention has been shown and described in detail, it will be understood that the scope of the invention is not limited thereto nor otherwise than by the terms of the appended claims.

What is claimed is:

1. A fluid operated control device comprising a fluid motor, a pilot valve for the motor, means responsive to a condition to be controlled to produce a controlling force, a pair of force responsive units connected to said means to move in response to the controlling force, means to delay the response of one of said units to the controlling force, a connection from said one of the units to the first named means to vary the controlling force, and a differential linkage connecting both of said units to the pilot valve.

2. A fluid operated control device comprising a fluid motor, a pilot valve for the motor, means responsive to a condition to be controlled to produce a controlling force, a pair of force responsive units connected to said means to move in response to the controlling force, means to delay the response of one of said units to the controlling force, a connection from said one of the units to the first named means to vary the controlling force, a connection from the motor to the first named means to vary the controlling force, and a connection from the other of said units to the pilot valve.

3. A fluid operated control device comprising a fluid motor, a pilot valve for the motor, means responsive to a condition to be controlled to produce a controlling force, a pair of force responsive units connected to said means to move in response to the controlling force, means to delay the response of one of said units to the controlling force, a connection from said one of the units to the first named means to vary the controlling force, a connection from the motor to the first named means to vary the controlling force, and a differential linkage connecting the units to the pilot valve.

4. A fluid operated control device comprising a fluid motor, a pilot valve for the motor, a fluid pressure producing device including a movable part to produce a controlling fluid pressure, a sensitive element responsive to a condition to be controlled connected to said part to move it, a pair of pressure responsive units connected to said device to be moved in response to the controlling fluid pressure, means to delay the response of one of said units to the controlling fluid pressure, a connection from said one of the units to said part to move the part in a direction to return the controlling fluid pressure to normal, and a differential linkage connecting both of said units to the pilot valve.

5. A fluid operated control device comprising a fluid motor, a pilot valve for the motor, a fluid pressure producing device including a movable part, a sensitive element responsive to a condition to be controlled connected to said part to move it, a pair of pressure responsive units connected to said device to be moved in response to the fluid pressure, means to delay the response of one of said units to the fluid pressure, a connection from said one of the units to said part to move the part in a direction to return the fluid pressure to normal, a connection from the motor to said part to move the part in a direction to return the fluid pressure to normal, and a connection from the other of said units to the pilot valve.

6. A fluid operated control device comprising a fluid motor, a pilot valve for the motor, a fluid pressure producing device including a movable part, a sensitive element responsive to a condition to be controlled connected to said part to move it, a pair of pressure responsive units connected to said device to be moved in response to the fluid pressure, means to delay the response of one of said units to the fluid pressure, a connection from said one of the units to said part to move the part in a direction to return the fluid pressure to normal, a connection from the motor to said part to move the part in a direction to return the fluid pressure to normal, and a differential linkage connecting both of said units to the pilot valve.

7. A fluid operated control device comprising a fluid motor, a pilot valve for the motor, a fluid pressure producing device including a movable part, a sensitive element responsive to a condition to be controlled connected to said part to move it, a pair of pressure responsive units connected to said device to be moved in response to the fluid pressure, means to delay the response of one of said units to the fluid pressure, a connection from said one of the units to said part to move the part in a direction to return the fluid pressure to normal, a connection from the motor to said part to move the part in a direction to return the fluid pressure to normal, a link connected at its ends to the units respectively, and a connection from the center portion of the link to the pilot valve.

8. A fluid operated control device comprising a fluid motor, a pilot valve for the motor, a fluid pressure producing device including a movable part, a sensitive element responsive to a condition to be controlled connected to said part to move it, a pair of pressure responsive units connected to said device to be moved in response to the fluid pressure, means to delay the response of one of said units to the fluid pressure, a connection from said one of the units to said part to move the part in a direction to return the fluid pressure to normal, a connection from the motor to said part to move the part in a direction to return the fluid pressure to normal, a link connected at one end to one of said units and at its center portion to the other unit, and a connection from the other end of the link to the pilot valve.

9. A fluid operated control device comprising a fluid motor, a pilot valve for the motor, a fluid pressure producing device including a movable part, a sensitive element responsive to a condition to be controlled connected to said part to move it, a pair of pressure responsive units connected to said device to be moved in response to the fluid pressure, means to delay the response of one of said units to the fluid pressure, a connection from said one of the units to said part to move the part in a direction to return the fluid pressure to normal, a connection from the motor to said part to move the part in a direction to return the fluid pressure to normal, the connections to said part from the sensitive element, the motor and said one of the units including a differential linkage to move the part when any portion of the linkage is moved, and a connection from the other of said units to the pilot valve.

References Cited in the file of this patent

UNITED STATES PATENTS

| Number | Name | Date |
|---|---|---|
| 2,169,982 | Manteuffel | Aug. 15, 1939 |
| 2,292,761 | Krogh | Aug. 11, 1942 |
| 2,325,103 | Bristol | July 27, 1943 |
| 2,400,126 | Matthews | May 14, 1946 |
| 2,638,874 | Woodhull | May 19, 1953 |